(12) United States Patent
Marchant et al.

(10) Patent No.: US 6,297,337 B1
(45) Date of Patent: Oct. 2, 2001

(54) BIOADHESIVE POLYMER COMPOSITIONS

(75) Inventors: Nancy S. Marchant, Medina; Simon Hsaio-Pao Yu, Westlake; Zahid Amjad, Brecksville, all of OH (US)

(73) Assignee: PMD Holdings Corp., Brecksville, OH (US)

( * ) Notice: Subject to any disclaimer, the term of this patent is extended or adjusted under 35 U.S.C. 154(b) by 0 days.

(21) Appl. No.: 09/314,842

(22) Filed: May 19, 1999

(51) Int. Cl.$^7$ .............................. C08F 20/02; C08F 20/10

(52) U.S. Cl. ................... 526/328; 526/932; 526/324; 526/329.7; 526/329.5; 526/332; 526/923; 526/930

(58) Field of Search ................ 526/240, 317.1, 526/318, 324, 319, 320.5, 329.7, 329.6, 332, 336, 932, 930, 923; 424/70.16, 78.33

(56) References Cited

U.S. PATENT DOCUMENTS

| | | | |
|---|---|---|---|
| Re. 32,649 | 4/1988 | Brandt et al. .................... 504/368 |
| 2,340,110 | 1/1944 | D'Alelio .......................... 210/24 |
| 2,340,111 | 1/1944 | D'Alelio .......................... 210/24 |
| 2,533,635 | 12/1950 | Seymour .......................... 8/62 |
| 2,798,053 | 7/1957 | Brown ............................. 260/2.2 |
| 3,915,921 | 10/1975 | Schlatzer, Jr. ................... 260/17.4 |
| 3,940,351 | 2/1976 | Schlatzer, Jr. ................... 260/17.4 |
| 4,062,817 | 12/1977 | Westerman ..................... 260/17.45 |
| 4,066,583 | 1/1978 | Spaulding ......................... 260/17.4 |
| 4,267,103 | 5/1981 | Cohen ............................. 260/17.4 |
| 4,286,082 | 8/1981 | Tsubakimoto et al. ............ 526/240 |
| 4,509,949 | 4/1985 | Huang et al. ..................... 486/558 |
| 4,617,186 | 10/1986 | Schafer et al. .................... 424/78 |
| 4,654,039 | 3/1987 | Brandt et al. ..................... 604/368 |
| 4,778,786 | 10/1988 | Reever et al. ..................... 514/54 |
| 4,794,166 | 12/1988 | Engelhardt et al. ................ 528/492 |
| 4,820,752 | 4/1989 | Berens et al. ..................... 523/340 |
| 4,996,274 | 2/1991 | Hsu ................................. 626/208 |
| 5,034,486 | 7/1991 | Tazi et al. ......................... 526/271 |
| 5,034,487 | 7/1991 | Tazi et al. ......................... 526/271 |
| 5,034,488 | 7/1991 | Tazi et al. ......................... 526/271 |
| 5,070,133 | * 12/1991 | Miyajima ......................... 524/501 |
| 5,298,258 | 3/1994 | Akemi et al. ...................... 424/484 |
| 5,349,030 | 9/1994 | Long, II et al. .................... 525/450 |
| 5,373,044 | 12/1994 | Adams et al. ..................... 524/379 |
| 5,472,704 | 12/1995 | Santus et al. ...................... 424/435 |
| 5,474,768 | 12/1995 | Robinson .......................... 424/78.31 |
| 5,536,508 | 7/1996 | Canal et al. ....................... 424/501 |
| 5,578,310 | 11/1996 | M'Timkulu et al. ............... 424/401 |
| 5,597,873 | 1/1997 | Chambers et al. ................. 525/330.1 |
| 5,608,005 | 3/1997 | Sojka ............................... 524/556 |
| 5,626,877 | 5/1997 | Amsden et al. .................... 424/489 |
| 5,643,603 | 7/1997 | Bottenberg et al. ................ 424/488 |
| 5,652,262 | 7/1997 | Crimmin et al. ................... 514/507 |
| 5,672,356 | 9/1997 | Rault et al. ........................ 424/468 |
| 5,674,934 | 10/1997 | Schmidt et al. .................... 524/555 |
| 5,691,382 | 11/1997 | Crimmin et al. ................... 514/575 |
| 5,700,486 | 12/1997 | Canal et al. ....................... 424/501 |
| 5,700,838 | 12/1997 | Dickens et al. .................... 514/575 |
| 5,747,514 | 5/1998 | Beckett et al. ..................... 514/352 |
| 5,750,136 | 5/1998 | Scholz et al. ...................... 424/448 |
| 5,763,621 | 6/1998 | Beckett et al. ..................... 549/65 |
| 5,773,428 | 6/1998 | Castelhano et al. ................ 514/80 |
| 5,783,208 | 7/1998 | Venkateshwaran et al. ........ 424/448 |
| 5,783,209 | 7/1998 | Imamura et al. ................... 424/448 |
| 5,800,803 | 9/1998 | Mirajkar et al. ................... 424/54 |
| 5,800,832 | 9/1998 | Tapolsky et al. ................... 424/449 |
| 5,830,915 | 11/1998 | Pikul et al. ........................ 514/620 |
| 5,840,329 | 11/1998 | Bai .................................. 424/458 |
| 5,840,939 | 11/1998 | Beckett et al. ..................... 554/37 |
| 5,846,561 | 12/1998 | Margalit ........................... 424/450 |
| 5,849,951 | 12/1998 | Floyd et al. ....................... 562/621 |
| 5,872,152 | 2/1999 | Brown et al. ...................... 514/575 |
| 6,024,942 | * 2/2000 | Tanner et al. ..................... 424/59 |

FOREIGN PATENT DOCUMENTS

| | | |
|---|---|---|
| 0371421 | 6/1990 | (EP) . |
| 0459373 | 12/1991 | (EP) . |
| 0676457 | 10/1995 | (EP) . |

OTHER PUBLICATIONS

Macromolecules, vol. 19, No. 3, pp. 542–547, "Water–Soluble Copolymers. 14. Potentiometric and Turbidimetric Studies of Water–Soluble Copolymers of Acrylamide: Comparison of Carboxylated and Sulfonated Copolymers", C.L. McCormick et al., 1986.

Drug Development and Industrial Pharmacy, vol. 23(5), pp. 489–515, 1997, "Mucoadhesive Drug Delivery Systems", A. Ahuja et al.

European Journal of Pharmaceutics & Biopharmaceutics, vol. 41(4), pp. 235–241, 1995, "Factors Affecting in Vitro Gastric Mucoadhesion I. Test Conditions and Instrumental Parameters", M.J. Tobyn et al.

Polymer Journal, vol. 30, No. 12, pp. 976–980, 1998, "Reduction/Oxidation Induced Cleavable/Crosslinkable Temperature–Sensitive Hydrogel Network Containing Disulfide Linkages", H. Lee et al.

International Journal of Pharmaceutics, vol. 138, pp. 103–112, 1996, "Tanned Leather: A Good Model For Determining Hydrogels Bioadhesion", Blanco–Fuente et al.

Acta. Pharmaceutics Technology, vol. 34(2), pp. 95–98, 1988, "Experimental Method for Bioadhesive Testing of Various Polymers", Robert et al.

European Journal of Pharmaceutics & Biopharmaceutics, vol. 42(1), pp. 56–61, 1996, "Factors Affecting in Vitro Gastric Mucoadhesion II. Physical Properties of Polymers", Tobyn et al.

(List continued on next page.)

Primary Examiner—David W. Wu
Assistant Examiner—R. Harlan
(74) Attorney, Agent, or Firm—Thoburn T. Dunlap; Brian M. Kolkowski

(57) ABSTRACT

Improved crosslinked ionic polymers or salts thereof having a soluble polymer fraction of less than about 15 wt %, and methods for making the same. The polymers are useful as bioadhesives, thickeners, emulsifiers, suspending aids, and pharmaceutical controlled release excipients.

43 Claims, No Drawings

OTHER PUBLICATIONS

European Journal of Pharmaceutics & Biopharmaceutics, vol. 44, pp. 159–167, 1997, "A Comparison of Different in Vitro Methods for Measuring Mucoadhesive Performance", Tamburic et al.

International Journal of Pharmaceutics, vol. 145, pp. 231–240, 1996, "Bioadhesion of Hydrated Chitosans: An In Vitro and In Vivo Study", Henriksen et al.

* cited by examiner

BIOADHESIVE POLYMER COMPOSITIONS

FIELD OF THE INVENTION

The invention relates to improved crosslinked ionic polymers useful as bioadhesives, thickeners, emulsifiers, emulsion stabilizers, suspending aids, and pharmaceutical controlled release excipients.

BACKGROUND OF THE INVENTION

Bioadhesion refers to the ability of certain synthetic and biological macromolecules and hydrocolloids to adhere to biological tissues. Bioadhesion is a complex phenomenon, depending in part upon the properties of polymers, biological tissue, and the surrounding environment. Several factors have been found to contribute to a polymer's bioadhesive capacity: the presence of functional groups able to form hydrogen bridges (—OH, COOH), the presence and strength of anionic charges, sufficient elasticity for the polymeric chains to interpenetrate the mucous layer, and high molecular weight.

Bioadhesion systems have been used in dentistry, orthopedics, ophthalmology, and in surgical applications. However, there has recently emerged significant interest in the use of bioadhesive materials in other areas such as soft tissue-based artificial replacements, and controlled release systems for local release of bioactive agents. Such applications include systems for release of drugs in the buccal or nasal cavity, and for intestinal or rectal administration.

Bioadhesive properties of certain natural cellulosics and crosslinked polyacrylic acids are described by Blanco-Fuente et al, *Intl. J. Phann.*, 138, 103–112 (1996). The bioadhesive properties of PNVP (poly-N-vinylpyrrolidone), and PHEMA (polyhydroxyethyl-methacrylate) are described by Robert et al, *Acta. Pharm. Technol.*, 34(2) :95–98 (1988). The bioadhesive capacity of certain anionic polymers (crosslinked polyacrylic acids and their salts) and natural non-ionic materials (i.e., carraggeenan, xanthan gum, etc.) has also been reported. Tobyn et al., *European Journal of Pharmaceutics and Bio-pharmaceutics*, 41(4), 235–241 (1995) and Tobyn et al., *European Joumal of Pharmaceutics and Biopharmaceutics* 42(1), 56–61 (1996). The bioadhesive capacity of cationic material (such as chitosan) was reported by Henriksen et al, *International Joumal of Pharmaceutics*, 145, 231–240 (1996).

Tobyn et al. conducted a bioadhesion study in which the pellet was brought into contact with the section of stomach at 0.5N for ten minutes. The standard deviation for Tobyn's results, however, ranged from approximately 20% to over 100%. In addition, the pig's stomach had to be freshly obtained and prepared. This presents many feasibility problems including availability, sensitivity to storage conditions, reproducibility between stomachs, and aesthetic considerations. Other references pertinent to measuring bioadhesion are: Ahuj et al., *Drug Development and Industrial Pharmacy*, 23(5), 489–515 (1997); Tamburic et al., *European Journal of Pharmaceutics and Biopharmaceutics* 44, 159–167 (1997); Tobyn et al., *European Joumal of Pharmaceutics and Biopharmaceutics* 41(4), 235–241 (1995), Tobyn et al., *European Joumal of Pharmaceutics and Biopharmaceutics* 42(1), 56–61 (1996).

U.S. Pat. No. 4,778,786 describes compositions for transdermal drug delivery containing polysaccharides, polyethylene glycol, salicylic acid, and AMPS (2-acrylamido 2-methylpropane-sulfonic acid). McCormick et al., *Macromolecules*, 19, 542–547 (1986) describes the phase behavior of certain acrylamide water-soluble copolymers compared to certain carboxylated and sulfonated polymers.

During or after its processing, certain undesirable residual materials can be removed from a polymeric composition. These residual materials are termed "extractables," referring to low molecular weight materials, such as residual monomers, residual solvents, and residuals from initiators (where organic initiators are used). Crosslinked ionic hydrogel polymers may be divided into two groups of materials: those which may be used for thickening, suspending and bioadhesive applications and those which may be used as superabsorbant material. The superabsorbant material is generally characterized in that it has a particle size of about 0.5–15 mm and the Elasticity Modulus is such that the particles have resistance to deformation and flow.

Gel strength relates to the tendency of the hydrogel formed from these polymers to deform or "flow" under usage stresses. Gel strength for superabsorbants needs to be such that the hydrogel formed does not deform and fill to an unacceptable degree the capillary void spaces in the absorbent structure or article, thereby inhibiting the absorbent capacity of the structure/article, as well as the fluid distribution through the structure/article. This type of behavior is undesirable in thickening, emulsifying and bioadhesive applications where the capacity to fill the void space is high in order to increase the viscosity of a solution without apparent graininess. Certain superabsorbant polymer particles are described in U.S. Pat. No. 4,654,039 to Brandt et al., reissued as Re. No. 32,649.

U.S. Pat. No. 4,794,166 describes a method of washing a superabsorbant polyacrylic acid polymer to remove oligomers by bringing the hydrogel into contact with a single-phase mixture of water and a solvent and then separating the mixture of water and solvent from the hydrogel. The process described in that patent was specifically chosen so that the hydrogel neither shrinks nor swells. The process introduces water swollen polymeric material to the washing step and thus the solvent mixture is chosen so that the polymer neither swells more or shrinks. After the mixture of water and solvent has been removed from the hydrogel, the hydrogel is usually dried or steamed, or steamed and then dried. Steaming is not an acceptable process, however, for a number of polymers.

In characterizing materials used as thickeners, emulsifiers and suspending aids, the response of these fluids to stress and simple flow fields may be used to determine their material functions such as viscosity and response to stress. Mathematical models have been developed to describe these properties. The measurement of material functions in these flows defines the practice of rheometry. Rheological measurements on gels, or thickened and suspended materials define the structure and properties of the material and can be used to identify changes and characteristics of an improved material over that being currently used. To those skilled in the art, interpretation of the response of a polymeric dispersion or gel to stress and strain is highly indicative of the material.

There is currently a need for polymeric compositions having improved bioadhesive properties, as well as a need for improved methods of making these polymer compositions. There is also a need for improved polymeric compositions for use as thickeners, emulsifiers, suspending aids, and pharmaceutical controlled release excipients.

SUMMARY OF THE INVENTION

The invention relates to crosslinked ionic polymers or salts thereof having a soluble polymer fraction of less than about 15 wt %, and at least one of the following characteristics: (I) a yield value of between about 10 and about 150 pascal; (ii) a Brookfield viscosity of between about 2,000 and about 150,000 mPa·S; or (iii) a microviscosity value of between about 0.01 and about 25.0 Pa·S when measured at a polymer concentration of 0.5 wt % in deionized water.

The crosslinked polymers can be homopolymer, copolymer, terpolymer, or interpolymer hydrogels. These hydrogels are preferably ionic, and may be polycarboxylic acids, polysulfonic acids, or salts thereof, and other vinyl polymerizable monomers. Preferred polysulfonic acids include: AMPS, sulfoethylmethacrylate (SEM), sulfopropyl methacrylate (SPM), sulfopropyl acrylate (SPA), N,N-dimethyl-N-methacryloxyethyl-N-(3-sulfopropyl) ammonium betaine, methacrylic acid amidopropyl-dimethyl ammonium sulfobetaine, and SPI {itaconic acid-bis(1-propyl sufonizacid-3) ester di-potassium salt}. Preferred carboxylic acids include acrylic acids, methacrylic acids, and maleic acids.

It will be appreciated that for carboxylic acids, the olefinic double bond in the carboxylic acid can be in either the $\alpha,\beta$-position with respect to a carboxyl group, or can be part of a terminal methylene group. The vinyl polymerizable monomers according to the invention may be vinyl monomers, vinylidene monomers, or both, having at least one terminal $CH_2=C$ group.

Preferred crosslinkers are multifunctional vinyl or vinylidene compounds, where the vinyl or vinylidene compound makes up between about 0.001 and about 2 mole percent of the polymer, and the vinylidene monomer has at least two terminal $CH_2=C$ groups.

The crosslinked ionic polymers of the invention may further have at least one $C_1$–$C_5$ alkyl vinyl ether polymerized therein. The polymers may also have at least one $C_2$–$C_{30}$ $\alpha$-olefin polymerized therein.

The crosslinked ionic polymers of the invention can have at least one monomer of the following formula:

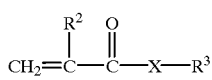

wherein $R^2$ is hydrogen, methyl or ethyl, X is O or NH, and $R^3$ is alkyl of 1 to 30 carbon atoms, and in an amount of less than 50 weight percent based upon the weight of the crosslinked ionic polymer. Preferably, $R^2$ is hydrogen or methyl and $R^3$ is an alkyl group containing 2 to 20 carbon atoms.

The crosslinker itself may be a monomer such as allyl pentaerythritol, allyl sucrose and trimethylolpropane diallylether.

It will be appreciated that the crosslinked ionic polymers of the invention can be synthesized by precipitation or dispersion polymerization in an organic media, as well as by reverse emulsion polymerization.

The crosslinked ionic polymers of the invention may further contain or be conjugated to at least one pharmaceutical agent or one enzyme, protein or other biologically derived active agent or a botanical agent such as a vegetal-derived agent.

The invention also relates to a method of making a crosslinked ionic polymer having a soluble polymer fraction of less than about 15% prepared by the steps of obtaining an ionic crosslinked polymeric material; contacting the polymeric material with a first solvent; contacting the polymeric material with a second solvent where the second solvent is miscible with respect to the first solvent but poorly soluble with respect to the polymeric material; precipitating the polymeric material; separating the precipitated polymeric material from the first solvent and the second solvent; and recovering the reaction product.

The invention also relates to a method of making an ionic crosslinked polymer having a soluble polymer fraction of less than about 15% prepared by the steps of obtaining a crosslinked ionic polymeric material; contacting the polymeric material with an acidic first solvent; contacting the polymeric material with a second solvent, where the second solvent is miscible with respect to the first solvent and forms a mixture with, but is poorly soluble with respect to the polymeric material; precipitating the polymeric material; separating the precipitated polymeric material from the first solvent and the second solvent; and recovering the reaction product thereof.

The second solvent may further contain one or more neutralizing agents.

The invention also relates to a method for preparing a crosslinked ionic polymer substantially free from soluble polymers by contacting a substantially anhydrous crosslinked ionic polymer with a single-phase mixture of water, a water miscible solvent, and neutralizing salt, and separating insoluble material from the mixture. Preferably, the weight ratio of water to solvent is sufficient to swell the crosslinked material while maintaining low viscosity thereof. The solvent may contain one or more neutralizing agent.

The invention further relates to a method of modulating the amount of crosslinked and non-crosslinked polymer in an ionic hydrogel by adjusting the amount of linear polymer and the molecular weight of the linear polymer, the adjustment including the step of washing the polymer mixture with a solvent or solvent mixture, where the solvent or solvent mixture is capable of selectively solubilizing the undesired fraction. The solvent may contain one or more neutralizing agent.

The crosslinked ionic polymers or salts thereof according to the invention are useful as bioadhesives, thickening agents, emulsifying agents, suspending aids, and excipients.

DETAILED DESCRIPTION OF THE INVENTION

The invention relates to crosslinked ionic polymers, or salts thereof, having a soluble polymer fraction of less than about 15 wt %. The compositions further have at least one of the following characteristics: a yield value of between about 10 and about 150 pascal, a Brookfield viscosity of between about 2,000 and about 150,000 mPa·S, or a microviscosity value of between about 0.01 and about 25.0 Pa·S when measured at a concentration of 0.5 wt % in deionized water. The invention also relates to methods of making these polymers.

As used herein, the term "extractables" refers to residual monomers, residual solvents, and residuals from initiators (where organic initiators are used). These extractables are all low molecular weight materials.

As used herein, the term "soluble polymer" refers to polymers having molecular weight (Mw) of about 300,000 Daltons or less. It will be appreciated that in accordance with the invention, in removing of soluble polymers other low molecular weight materials can also be removed from the desired product.

Brookfield viscosity is a commonly used method for measuring the viscosity of plastisols and other viscoelastic materials. Brookfield viscosity is determined by measuring the shearing stress on a spindle rotating at a definite, constant speed while it is immersed in the sample. Brookfield viscosity is measured in centipoises. Viscosity is a function of shear rate and is defined as shear stress/shear rate.

Microviscosity is the limiting viscosity of a system at high shear rates. This material property is obtained from the Casson Theological model measured by the slope of the line of shear stress/shear rate.

Yield stress is determined from fitting the shear stress/shear rate curve with the Casson Theological model and the Y intercept is the yield stress.

The Casson mathematical model is represented by the formula:

$$Y^{1/p} = a + b \cdot X^{1/p}$$

where Y is shear stress, X is shear rate, p equals 2, b is microviscosity and a is Yield stress.

Hydrogels are polymers that swell in water. The term, "swelling" refers to the taking up of a liquid by a gel with an increase in volume. Only those liquids that solvate a gel can cause swelling. The swelling of ionic hydrogel gels is influenced by pH and the presence of electrolytes. Hydrogels have a large molecular weight that generally cannot be measured by conventional methods because they are too large, and are composed of a polymer backbone and crosslinks. The crosslinks can be used to extend the molecular weight of a polymer if the ratio of crosslinker to non-crosslinker is low, and polymerization is confined below the gel point. Nevertheless, if the ratio of crosslinking monomer to non crosslinker monomer is high enough, a gel is formed that while still being able to swell in a solvent, it does not truly dissolve.

It will be appreciated that molecular weight extended material is part of the 'soluble polymer' as recited herein, and is also removed. It has now been found that this portion of material formed during the polymerization has surprising influence on the hydrogel properties as evidenced in the yield stress, viscosity, microviscosity, and bioadhesion measurements. It will be appreciated that even if the crosslinker to monomer ratio is high, a portion of the material is extended, but soluble. Such material may also be highly branched, but is nevertheless soluble under certain conditions.

So-called "extractable" materials are distinct from soluble polymers. Many patents and processes are designed to lower the residual solvent and monomer content but do little to lower the soluble polymer content despite certain claims to the contrary. Many superabsorbent polymers contain significant levels of soluble polymer material.

U.S. Pat. No. 4,286,082 describes hydrogels describe low "water-solubles" as a factor for safety reasons.

Preferred hydrogels include sulfonated hydrogels and carboxylic acid hydrogels. Preferred sulfonated hydrogels include AMPS, SEM (sulfoethylmethacrylate), SPM (sulfopropyl methacrylate), SPA (sulfopropyl acrylate), N,N-dimethyl-N-methacryloxyethyl-N-(3-sulfopropyl) ammonium betaine, methacryllic acid amidopropyl-dimethyl ammonium sulfobetaine, and SPI {itaconic acid-bis(1-propyl sulfonizacid-3) ester di-potassium salt}. These may be in the form of sulfonated monomers or polymers. Preferred carboxylic acid hydrogels are acrylic acids, methacrylic acids, itaconic acids, AMBC (3-acrylamido-3-methylbutanoic acid), beta-carboxyethyl acrylate (acrylic acid dimers), and maleic anhydride-methylvinyl ether polymers.

Suitable polymers in accordance with the invention also include carbomer type polymers. Carbomer resins are high molecular weight, crosslinked, acrylic acid-based polymers. A number of agencies, including the USP-NF, and United States Adopted Names Council (USAN) have adopted the generic name "carbomer" for polyacrylic acid types of resins demonstrated by Carbopol® and competitive polymers such as Synthalen® and Acritamer®. There are other carbomer resins available, with viscosity ranges from 2,000–100,000 mPa·S, at 1 wt % in deionized water.

When in the presence of water or other suitable solvents (ethanol, methanol, etc.) these polymers form hydrogels. U.S. Pat. Nos. 4,267,103, 5,349,030, 4,996,274, 4,509,949, 5,373,044 describe these polyacrylic acid polymers, including Carbopol® resins (B.F. Goodrich). The entire contents of these patents are incorporated herein by reference.

The polymers for use in the invention may be homopolymers, copolymers, and block copolymers, including diblock, triblock, multiblock, graft, or starblock copolymers, and interpolymers with other hydrophilic polymers so long as the polymers are crosslinked to form a gel network and are swellable.

Suitable polymers in accordance with the invention also include homopolymers of unsaturated polymerizable carboxylic acids. This includes acrylic acids, methacrylic acids, maleic acids, maleic anhydrides, itaconic acids and the like; or copolymers of said acid or anhydride monomers with (meth)acrylate esters, (meth)acrylamides, olefins, maleic anhydrides, vinyl esters, vinyl ethers, and styrenics; or copolymers with other vinyl or vinylidene monomers. Copolymers of these acids may be crosslinked with small amounts of crosslinking agents. These materials are normally prepared by polymerization with a free radical catalyst in an organic medium in a closed vessel or autoclave equipped with stirring. During polymerization, the polymer precipitates from the solution as it is formed. The precipitated polymer is recovered and dried to remove residual solvent. The polymer in a powder form is used by dispersing it in water and neutralizing it to use its thickening, suspending or emulsifying ability. Such polymers are disclosed in U.S. Pat. Nos. 2,798, 053; 3,915,921; 3,940,351; 4,062,817; 4,066,583; and 4,267,103. A steric stabilizer as described in U.S. Pat. No. 5,373,044 to Adams, et al. may be used. The contents of this patent are hereby incorporated by reference. Such steric stabilizer-containing polymers are termed "interpolymers."

The carboxyl-containing polymers are prepared from monomers containing at least one activated >C=C group.

Typical materials are those described in U.S. Pat. No. 2,798,053. Copolymers, for example, include copolymers of acrylic acid with small amounts of polyalkenyl polyether cross-linkers that are gel-like polymers, which, especially in the form of their salts, absorb large quantities of water or solvents with subsequent substantial increase in volume. Other useful carboxyl-containing polymers are described in U.S. Pat. No. 3,940,351, directed to polymers of unsaturated carboxylic acid and at least one alkyl acrylic or methacrylic ester where the alkyl group contains 10 to 30 carbon atoms, and U.S. Pat. Nos. 5,034,486; 5,034,487; and 5,034,488; which are directed to maleic anhydride copolymers with vinyl ethers. Other types of such copolymers are described in U.S. Pat. No. 4,062,817 where the polymers described in U.S. Pat. No. 3,940,351 contain another alkyl acrylic or methacrylic ester and the alkyl groups contain 1 to 8 carbon atoms. Carboxylic polymers and copolymers such as those of acrylic acid and meth-acrylic acid also may be crosslinked with polyfunctional materials as divinyl benzene, unsaturated diesters and the like, as is disclosed in U.S. Pat. Nos. 2,340,110; 2,340,111; and 2,533,635. The disclosures of all of these U.S. patents are hereby incorporated herein by reference.

The carboxylic monomers are olefinically-unsaturated carboxylic acids containing at east one activated carbon-to-carbon olefinic double bond, and at least one carboxyl group; that is, an acid or function readily converted to an acid containing an olefinic double bond which readily functions in polymerization because of its presence in the monomer molecule, either in the alpha-beta position with respect to a carboxyl group (C=C—COOH), or as part of a terminal methylene grouping ($CH_2$=C). Olefinically unsaturated acids of this class include such materials as the acrylic acids typified by the acrylic acid itself, α-cyano acrylic acid, β-methylacrylic acid (crotonic acid), α-phenyl acrylic acid, facryloxy propionic acid, cinnamic acid, p-chloro cinnamic acid, 1-carboxy- 4-phenyl butadiene-1,3 itaconic acid, citraconic acid, mesaconic acid, glutaconic acid, aconitic acid, maleic acid, fumaric acid, and tricarboxy ethylene. As used herein, the term "carboxylic acid" includes polycarboxylic acids and acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure:

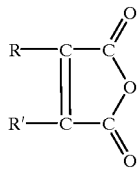

wherein R and R' are selected from the group consisting of hydrogen, halogen, and cyano (—C≡N) groups, and alkyl, aryl, alkaryl, aralkyl, and cycloalkyl groups such as methyl, ethyl, propyl, octyl, decyl, phenyl, tolyl, xylyl, benzyl, cyclohexyl, and the like.

Preferred carboxylic monomers are mono-olefinic acrylic acids having the general structure:

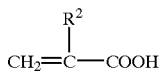

wherein $R^2$ is selected from the class consisting of hydrogen, halogen, and cyano (C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Other useful carboxylic monomers are maleic acid and its anhydrides.

The polymers include both homopolymers of carboxylic acids or anhydrides thereof, or the defined carboxylic acids copolymerized with one or more other vinylidene monomers containing at least one terminal $CH_2$ group. The other vinylidene monomers are present in an amount of less than 50 weight percent based upon the weight of the carboxylic acid or anhydride plus the vinylidene monomer(s). Such monomers include, for example, acryl monomers including those acrylic acid ester monomers and acrylamide monomers such as derivatives represented by the formula:

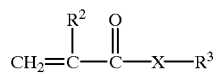

wherein $R_3$ is an alkyl group having from 1 to 30 carbon atoms, preferably 1 to 20 carbon atoms and $R_2$ is hydrogen, methyl or ethyl, present in the copolymer in amount, for example, from about 1 to 40 weight percent or more and X is O or NH.

Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like. Higher alkyl acrylic esters are decyl acrylate, isodecyl methacrylate, lauryl acrylate, stearyl acrylate, behenyl acrylate and melissyl acrylate. Mixtures of two or three or more long chain acrylic esters may be successfully polymerized with one of the carboxylic monomers. Other comonomers include olefins, including alpha olefins, vinyl ethers, vinyl esters, and hydroxyalkyl acrylates, hydroxyalkyl methacrylates, hydroxyalklyacrylamides and hydroxyalkyl methacrylamides and mixtures thereof.

Acrylic amides containing from 3 to 35 carbon atoms including monoolefinically unsaturated amides also may be used. Representative amides include acrylamide, methacrylamide, N-t-butyl acrylamide, N-cyclohexyl acrylamide, higher alkyl amides, where the alkyl group on the nitrogen contains from 8 to 32 carbon atoms, acrylic amides including N-alkylol amides of α,β-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, N-methylol-p-vinyl benzamide, and the like. Still further useful materials are alphaolefins containing from 2 to 18 carbon atoms, more preferably from 2 to 8 carbon atoms; dienes containing atom 4 to 10 carbon atoms; vinyl esters and allyl esters such as vinyl acetate; vinyl aromatics such as styrene, methyl styrene and chlorostyrene; vinyl and allyl ethers and ketones such as vinyl methyl ether and methyl vinyl ketone; chloroacrylates; cyanoalkyl acrylates such as α-cyanomethyl acrylate, and the alpha, beta, or gamma-cyanopropyl acrylates; alkoxyacrylates such as methoxy ethyl acrylate; haloacrylates as chloroethyl acrylate; vinyl halides and vinyl chloride, vinylidene chloride and the like; divinyls, diacrylates and other polyfunctional monomers such as divinyl ether, diethylene glycol diacrylate, ethylene glycol dimethacrylate, methylene-bis-acrylamide, allyl-pentaerythritol, and the like; and bis (β-haloalkyl) alkenyl phosphonates such as bis(β-chloroethyl) vinyl phosphonate and the like as are known to those skilled in the art.

Copolymers wherein the carboxy containing monomers and other vinylidene monomers are readily prepared in accordance with the process of this invention.

The polymers also may be crosslinked with a polyene, e.g., decadiene or trivinyl cyclohexane; acrylamides, such as methylene bis acrylamide; polyfunctional acrylates, such as trimethylol propane triacrylate; or polyfunctional vinylidene monomer containing at least 2 terminal $CH_2$=C groups, including for example, butadiene, isoprene, divinyl benzene, divinyl naphthlene, allyl acrylates, and the like. Other vinylidene monomers may also be used, including the acrylic nitriles. Preferred α,β-olefinically unsaturated nitriles are monoolefinically unsaturated nitriles having from 3 to 10 carbon atoms such as acrylonitrile, methacrylonitrile, and the like. Most preferred are acrylonitrile and methacrylonitrile. The amounts used are, for example, for some polymers are from about 1 to 30 weight percent of the total monomers copolymerized.

As noted, steric stabilizers may be used in the polymerization to provide a stenic barrier which repulses approaching particles, and may be used in accordance with the invention. Steric stabilizers have a hydrophilic group and a hydrophobic group, and are block copolymers having a soluble block and an anchor block having a molecular weight (i.e., chain length) usually well above 1000, but a hydrophobe length of more than 50 Angstroms (Å), as calculated by the Law of Cosines.

Pharmaceutically active agents may be conjugated to the polymer. Several methods are known to those skilled in the art and the following gives representative methods, but should not be construed to be the only method available. To reversibly bind a thiol-containing compound to a carboxylic acid functional polymer, one method that can be used is to form a thiol ester bond. This is achieved by converting a portion of the carboxylic acid side groups to acyl halides using techniques known in the art. The polymer-containing acyl halide will then react with thiol-containing compounds to form the thiol ester. The thiol ester group can then undergo hydrolysis to regenerate the thiol containing compound and the carboxylic acid polymer.

Polymers which present hydroxyl groups as the points of attachment for the compound may be used as derivatives of benzyl alcohol, the peptide, or non-peptide being attached as a benzyl ester and cleaved by hydrolysis, acidolysis or aminolysis to release the compound as a carboxylic acid, or as a carboxamide. Also suitable are polymer substrates which present amino groups, including derivatives of diphenylmethylamine, the peptide or non-peptide being attached as a carboxamide and cleaved by acidolysis to release the peptide or non peptide as a carboxamide. Substitution of such linkers by a nitro group enables the photolytic cleavage of the peptide or non peptide from the residue of the solid substrate.

The polymers in accordance with the invention may be bound to an active compound which is directly or indirectly linked to the relevant N or O atom by a covalent bond which is cleavable by acid hydrolysis. Within carboxylic acid polymers, a small amount of the amine substituted monomer or hydroxyl substituted monomer can be copolymerized or generated through methods known in the art of solid phase peptide synthesis. Known base substrates also include amino- and hydroxy-functionalized solid substrates, i.e., those which are chemically modified by introduction of amino or hydroxyl groups, to serve as convenient points for further chemical manipulation.

It is known in the art of solid phase peptide synthesis that hydroxyl- or amino-carrying linker groups can be introduced onto amino and hydroxy functionalized solid substrates, the linker group having characteristics which facilitate the cleavage of the desired synthesized molecule from the solid support. Thus, for hydroxyl-carrying linker groups, the first amino acid of the peptide to be constructed can be attached as an ester formed between the linker-presented hydroxyl group and the carboxyl group of the amino acid. For amino-carrying linker groups, the first amino acid of the peptide can be attached as a carboxamide formed between the linker-presented amino group and the carboxyl group of the amino acid. An example of a solid support resin presenting amino groups on linker groups attached to the base substrate is the resin 5-(4'-aminomethyl-3',5'-dimethoxyphenoxy)-(N,4-methylbenzhydryl)-pentyramide copolymer. Protecting groups can be employed during the synthesis to protect hydroxyl groups, amine groups, and carboxyl protecting groups. However, the product containing the protecting groups can be further treated, in one or several steps, before or after isolation from the reaction medium, to remove any amine protecting group, carboxyl protecting group, or hydroxyl protecting group present. Removal of amine protecting groups, carboxyl protecting groups, or hydroxyl protecting groups are known. T. W. Greene, *Protective Groups in Organic Synthesis*, 2nd Edition, (New York, 1991). Active compounds of the hydroxamic acid family can also be bound to the polymer through an hydroxamate ester. Through hydrogenation, the hydroxamic acid is liberated from the polymers. Reaction of a polymer containing styrene with $CH_2Cl$ side group is then converted to an O-benzyl hydroylamine side group through known techniques. This functional precursor is then bound to a stereospecific carboxylic acid, or ester or acyl chloride through conventional peptide coupling conditions to link the stereospecific hydroxamate to the polymeric support. Through hydrolysis reactions in the body, the free hydroxamic acid is generated. Compounds and active inhibitors in this regards are described in e.g., U.S. Pat. Nos. 5,830,915; 5,773,428; 5,872,152; 5,849,951; 5,840,939; 5,763,621; 5,747,514; 5,700,838; 5,691,382; and 5,652,262. The contents of these patents are hereby incorporated by reference.

At a concentration of 0.5 wt % in deionized water, these polymers further have at least one of the following features: (a) yield value of between about 10 and about 150 pascal, (b) Brookfield viscosity of between about 2,000 and about 150,000 mPa·S; and (c) microviscosity value of between about 0.01 and about 25.0 Pa·S.

The effects of soluble polymer to the properties of emulsifying, thickening and bioadhesive polymers has not been recognized. In accordance with the invention, the properties of emulsifying, thickening, and bioadhesive polymers can be tuned with respect to their rheolgical properties by controlling the type and amount of soluble polymer.

During a crosslinking polymerization reaction a portion of the polymer is made that is linear and a portion is made that is crosslinked. Generally the two polymers are entangled in each other during synthesis yet may be separated by suspending the initially isolated material in a solvent or solvent mixture which swells the crosslinked material sufficiently, and selectively precipitating the crosslinked material. By selecting the proper conditions the crosslinked material is swollen sufficiently yet not so much that high viscosity is seen. If the process conditions are chosen correctly, only the crosslinked material is precipitated so that it may be separated by filtration or centrifugation. By selecting the proper solvent mixture the amount of and nature of the soluble polymer can be chosen.

GPC data presented below shows that the molecular weight (Mw) of the extracted material is extremely broad and that the Mw is as high as 300,000 Daltons and this is well beyond the conventional definition of "oligomers."

The properties of the precipitated material have been found to be surprisingly different than that of the original material. It was unexpectedly found that the extracted material had dramatically enhanced thickening and bioadhesive efficiency. Much higher viscosity solutions may be achieved at lower concentration of low crosslinked materials. Much higher viscosity is achieved at the same concentration for higher crosslinked materials.

As used herein, the term, "processed" refers to those polymers having the soluble polymer fraction removed.

The viscosity behavior of crosslinked polyelectrolyte materials have been understood in terms of a model based on close packed spheres. At low concentrations, no yield stress and little viscosity is observed because the swollen microgels are not tightly packed. Above some minimum packing concentration the particles are viewed as being closely packed deformable particles and the viscosity builds tremendously. Yield behavior and viscosity only begins when the concentration is such that the particles become closely packed. It has now been shown that the soluble polymer was acting to reduce the viscosity building properties of the system. Thus much more efficient viscosity building occurs without the soluble polymer and the overlap concentration of the processed material is surprisingly lower than the original mixture.

In accordance with the invention, it will be appreciated that the compositions may further include one or more pharmaceutical agents. Suitable pharmaceutical agent categories include glucocorticoids, dexamethasone, dexamethasone sodium phosphate, isothiozolones, anticoagulants, heparin, hirudin, peptides, oligopeptides, angiopeptin, antimitotic agents, polynucleotides, and oligonucleotides, sulfyhdryls, hydroxamic acids, oral compositions including bioadhesive syrups and gels, cough syrups, mouth wash, oral gels for mouth sores, and optical formulations such as eye drops.

A number of additional pharmaceutical agents can be used in accordance with the invention. Suitable types of pharmaceutical agents include, for example, poly-nucleotides, oligonucleotides, peptides (such as oligopeptides and polypeptides) including cytokines, proteins, enzymes, hormones, monoclonal antibodies, human growth hormones, clotting factors, colony stimulating factors, erythropoietins, tissue plasminogen activators, recombinant soluble receptors, and vaccines.

Preferred pharmaceutical agents include cytokines, antibacterial agents, anti-neoplastic agents, anti-fungal agents, immunomodulators, antiparasitic agents, and CNS agents. Preferred pharmaceutical agents thus include taxane-related antineoplastic agents such as paclitaxel (Taxol®), anthracyclines (including doxorubicin, daunorubicin, epirubicin, idarubicin, mithoxanthrone and carminomycin), mitomycin-type antibiotics, polyene antifungals such as amphotericin B, immunomodulators including tumor necrosis factor alpha (TNFα), and interferons.

Suitable preferred agents include antibacterial agents such as penicillin-related compounds including 9-lactam antibiotics, broad spectrum penicillins, and penicillinase-resistant penicillins (such as ampicillin, ampicillin-sublactam, nafcillin, amoxicillin, cloxacillin, methicillin, oxacillin, dicloxacillin, azocillin, bacampicillin, cyclacillin, carbenicillin, carbenicillin indanyl, meziocillin, penicillin G. penicillin V, ticarcillin, piperacillin, aztreonam and imipenem, cephalosporins (cephalosporins include first generation cephalosporins such as cephapirin, cefaxolin, cephalexin, cephradine and cefadroxil; second generation cephalosporins such as cefamandole, cefoxitin, cefaclor, cefuroxime, cefuroxime axetil, cefonicid, cefotetan and ceforanide; third generation cephalosporins such as cefotaxime, ceftizoxime, ceftriaxone, cefoperazone and ceftazidime), tetracyclines (such as demeclocytetracycline, doxycycline, methacycline, minocycline and oxytetracycline), beta-lactamase inhibitors (such as clavulanic acid), aminoglycosides (such as amikacin, gentamicin C, kanamycin A, neomycin B, netilmicin, streptomycin and tobramycin), chloramphenicol, erythromycin, clindamycin, spectinomycin, vancomycin, bacitracin, isoniazid, rifampin, ethambutol, aminosalicylic acid, pyrazinamide, ethionamide, cycloserine, dapsone, sulfoxone sodium, clofazimine, sulfonamides (such as sulfanilamide, sulfamethoxazole, sulfacetamide, sulfadiazine, and sulfisoxazole), trimethoprim-sulfamethoxazole, quinolones (such as nalidixic acid, cinoxacin, norfloxacin and ciprofloxacin), methenamine, nitrofurantoin and phenazopyridine. Such agents further include agents active against protozoal infections such as chloroquine, diloxanide furoate, emetine or dehydroemetine, 8-hydroxyquinolines, metronidazole, quinacrine, melarsoprol, nifurtimox, pentamidine, sodium stibogluconate and suramin.

Suitable pharmaceutical agents also include antifungal agents such as amphotericin-B, flucytosine, ketoconazole, miconazole, itraconazole, griseofulvin, clotrimazole, econazole, terconazole, butoconazole, ciclopirox olamine, haloprogin, toinaftate, naftifine, nystatin, natamycin, undecylenic acid, benzoic acid, salicylic acid, propionic acid and caprylic acid. Suitable agents further include antiviral agents such as zidovudine, acyclovir, ganciclovir, vidarabine, idoxuridine, trifluridine, foxcarnet, amantadine, rimantadine, and ribavirin.

The polymer compositions can further comprise a variety of polypeptides including antibodies, immunomodulators or cytokines (including interferons or interleukins), peptide hormones (such as colony stimulating factors and tumor necrosis factors), hormone receptors, neuropeptides, lipoproteins (such as α-lipoprotein), erythropoietins, growth hormones, thyroid hormones, toxins such as diphtheria toxin, proteoglycans such as hyaluronic acid, and glycoproteins such as gonadotropin hormone.

The polymers also can be administered in conjunction with enzyme inhibiting agents such as reverse transcriptase inhibitors, protease inhibitors, angiotensin converting enzymes, 5α-reductase, and the like. Typical agents include peptide and nonpeptide agents including finasteride, lisinopril, saquinavir, quinapril, ramipril, indinavir, ritonavir, nelfinavir, zalcitabine, zidovudine, allophenyinorstatine, kynostatin, delaviridine, bis-tetrahydrofuran ligands, and didanosine.

It will be appreciated that combinations of these agents can also be employed. It will be further appreciated that the invention is not directed to the underlying specific activity of these agents, but rather to the compositions themselves.

Chemotherapeutic agents appropriate for use in the invention also include, vinca alkaloids (such as vincristine and vinblastine), mitomycin-type antibiotics (such as mitomycin-C and N-methyl mitomycin-C), bleomycin-type antibiotics such as bleomycin A2, antifolates such as methotrexate, aminopterin, and dideaza-tetrahydrofolic acid, colchicine, demecoline, etoposide, taxanes such as paclitaxel (Taxol®), and anthracycline antibiotics. Suitable tetracycline antibiotics include, without limitation, doxorubicin, daunorubicin, carminomycin, epirubicin, idarubicin, mithoxanthrone, 4-demethoxy-daunomycin, 11-deoxydaunorubicin, 13-deoxydaunorubicin, adriamycin-14-benzoate, adriamycin-14-octanoate, or adriamycin-14naphthaleneacetate.

The appropriate dosage for the pharmaceutical agents will often be approximately comparable to that of the pharmaceutical agent alone; dosages will be set by the prescribing medical professional considering many factors including age, weight, and condition of the patient, as well as the pharmacokinetics of the specific agent. Often the amount of agent required for effective treatment will be less than the amount required using the free pharmaceutical agent. Generally, an effective amount of pharmaceutical agents is that amount effective to reduce the symptoms of the disease sought to be treated, or to induce a pharmacological change relevant to treating the disease sought to be treated.

It will be appreciated by those skilled in the art that these polymeric compositions may have further applications in the area of pharmaceutical excipients. The term excipient is defined herein as "an additive to a pharmaceutical formulation contributing tdff specific properties to the formulation, but is not considered a drug." In one aspect, the invention relates to the improved efficiency in swelling, thickening, bioadhesion, and other improved properties of the polymers of the invention. Use of these as improved osmotic engine excipients, improved tablet binder excipients and improved controlled release excipients and improve bioadhesive excipients and as disintagrents, osmotic agents, and the like are consistent within the uses of the polymer as an excipient.

The foregoing detailed description is given for clearness of understanding only, and no unnecessary limitations should be understood therefrom. Hence, numerous modifications and changes can be made by those skilled in the art without departing from the spirit and scope of the invention. The following examples will serve to further typify the nature of the invention but should not be construed as a limitation on the scope thereof, which is defined solely by the appended claims.

Example 1

Preparation of Interpolymer

This example illustrates polymerization of an interpolymer of acrylic acid with an acrylate ester in a water jacketed two liter Pyrex resin kettle equipped with mechanical stirrer, a thermometer, and a reflux condenser topped with a nitrogen inlet connected to a bubbler to provide a slightly positive pressure of nitrogen throughout the polymerization.

The water jacket was connected to a constant temperature circulator. The resin kettle was charged with ethyl acetate (656.1 grams), cyclohexane (558.9 grams), acrylic acid (276.45 grams), stearyl methacrylate (8.55 grams), allylsucrose (1.71 grams), and a steric stabilizing surface active agent (8.55 grams) all based upon the acrylic acid and acrylate ester comonomers (ie., phm or parts per hundred monomers). The mixture was sparged with nitrogen for 30 minutes while the reactor was heated to 50° C. At 50° C., the sparging tube was removed while a nitrogen purge was maintained, stirring was begun, and di-(2-ethylhexyl)-peroxydicarbonate in an amount of 0.20 to 0.98 grams was added, the exact amount depending upon process conditions. Polymerization was evident in a matter of minutes as the solution became hazy with precipitated polymer, but the polymerization was continued for a total of 8 hours when polymerization was considered complete. The polymer slurry was then transferred to a single neck flask for solvent removal by a rotary evaporator at 95° C. to 105° C. at 27 inches of vacuum. After drying, the result is a fine white interpolymer product which when dispersed in water and neutralized, can be used to make thickened aqueous solutions, emulsions or act as emulsion stabilizers and suspending aids.

Example 2

Preparation of Polymer in Organic Solvents

This example illustrates the polymerization of a polymer of acrylic acid in an organic solvent where in the organic solvent may be a mixture of solvents in a water jacketed two liter Pyrex resin kettle equipped with mechanical stirrer, a thermometer, and a reflux condenser topped with a nitrogen inlet connected to a bubbler to provide a slightly positive pressure of nitrogen throughout the polymerization was employed.

The water jacket was connected to a constant temperature circulator. The resin kettle was charged with organic solvent reaction medium (1320 gm) acrylic acid (180 grams), allylpentaerythitol (0.2 to 1.4 parts per hundred monomer). The mixture was sparged with nitrogen for 30 minutes while the reactor was heated to 50° C. At 50° C., the sparging tube was removed while a nitrogen purge was maintained, stirring was begun, and the recipe amount of free radical catalyst (in an amount of 0.20 to 0.98 grams) was added, the exact amount depending upon process conditions. Polymerization was evident in a matter of minutes as the solution became hazy with precipitated polymer, but the polymerization was continued for a total of 8 hours when polymerization was considered complete. The polymer slurry was then transferred to a single neck flask for solvent removal by a rotary evaporator at 95° C. to 105° C. at 27 inches of vacuum. After drying, the result is a fine white product which when dispersed in water and neutralized, can be used to make thickened aqueous solutions, emulsions or act as emulsion stabilizers and suspending aids.

Example 3

Preparation of Polymer in Ethylacetate

This example illustrates the polymerization of an polymer of acrylic acid in ethylacetate with partial neutralization in a water jacketed two liter Pyrex resin kettle equipped with mechanical stirrer, a thermometer, and a reflux condenser topped with a nitrogen inlet connected to a bubbler to provide a slightly positive pressure of nitrogen throughout the polymerization was employed.

The water jacket was connected to a constant temperature circulator. The resin kettle was charged with ethyl acetate (1320 gm), acrylic acid (165 grams), potassium carbonate (1.5 phm), allyl pentaerythritol (0.2 to 1.4 phm). The mixture was sparged with nitrogen for 30 minutes while the reactor was heated to 50° C. At 50° C., the sparging tube was removed while a nitrogen purge was maintained, stirring was begun, and the recipe amount of di-(2-ethylhexyl)-peroxydicarbonate (in an amount of 0.20 to 0.98 grams) was added, the exact amount depending upon process conditions. Polymerization was evident in a matter of minutes as the solution became hazy with precipitated polymer, but the polymerization was continued for a total of 8 hours when polymerization was considered complete. The polymer slurry was then transferred to a single neck flask for solvent removal by a rotary evaporator at 95° C. to 105° C. at 27 inches of vacuum. After drying, the result is a fine white product which when dispersed ib in water and neutralized, can be used to make thickened aqueous solutions, emulsions, or act as emulsion stabilizers and suspending aids.

Example 4

Measuring Soluble Polymer Via Ultracentrifuge 0.5 w. % polymer dispersions in $(NH_4)HCO_3$ stock solution are prepared. The samples are carefully weighed and then centrifuged. The settled material from each sample is separated from the solution. The soluble polymer content is measured by evaporative mass detection against a standard curve of linear polyacrylic acid.

The results obtained are set forth in the following table which indicates the molecular weight of soluble material extracted from typical polymerizations conducted in the above manner and that of some commercial polymers. The following table demonstrates the molecular weight of soluble material extracted

G.P.C. Data on Soluble Polymer

| Polymerization Solvent | Phm Crosslinker or Trade Name | Extraction Method | Mn | Mw | MWD |
|---|---|---|---|---|---|
| EthylAcetate | 0.3 | IPA | 8,648 | 306,400 | 35.42 |
| EthylAcetate | 0.8 | Ultra centri. | 7,452 | 101,000 | 13.557 |
| Cosolvent | 1.1 | Ultra centri. | 18,770 | 135,800 | 7.230 |
| Benzene | 1.0 | Ultra centri. | 5,971 | 65,070 | 10.90 |
|  | Polygel DK | Ultra centri. | 2,915 | 62,740 | 21.52 |
|  | Synthalen K | Ultra centri. | 7,267 | 88,720 | 10.73 |
|  | Acritamer 940 | Ultra centri. | 5,971 | 65,070 | 10.89 |
| Cosolvent | 0.6 | Ultra centri. | 3,317 | 39,640 | 11.95 |
| Benzene | 0.0 |  | 146,300 | 603,300 | 4.120 |
| Benzene | 0.0 | Ultra centri. | 168,900 | 736,800 | 4.360 |

Example 4

Measuring Soluble Polymer Via Ultracentrifuge

A 0.5 wt. % polymer dispersion in $(NH_4)HCO_3$ stock solution is prepared. The samples are carefully weighed and then centrifuged. The settled material is separated from the solution. The soluble polymer content measured by evaporative mass detection against a standard curve of linear polyacrylic acid.

Example 5

Extraction of Polymer

Crosslinked polymers are dispersed in distilled water and the dispersion viscosity recorded. For each sample, the dispersion is neutralized and the mucilage viscosity recorded. Isopropanol is added until the solution becomes cloudy. The solids are separated from the solution by centrifugation. The solids are then dried under vacuum to remove solvent. The molecular weight of the soluble polymer is checked by GPC. After drying the solids are isolated as a white powder. The results are set forth below:

The crosslinked polymer is dispersed in distilled water and the dispersion viscosity recorded. The dispersion is neutralized and the mucilage viscosity recorded. Isopropanol is added until the solution becomes cloudy. The solids are separated from the solution by centrifugation. The solids are then dried under vacuum to remove solvent. The molecular weight of the soluble polymer is checked by GPC. After drying the solids are isolated as a white powder. The results are set forth below:

| Polymerization Solvent | Phm Crosslinker Or Polymer Name | Wt poly/ vol. H$_2$O | BV disp. | BV pH 7.5 | Poly/water Dispersion Mass (g) | IPA added Mass (g) | Ratio |
|---|---|---|---|---|---|---|---|
| Ethylacetate* | 0.3 | 1.0 |  | 10800 | 388.66 | 254.94 | 0.655946 |
| Ethylacetate* | 0.3 | 1.5 |  | 14300 | 393.12 | 268.47 | 0.682921 |
| Ethylacetate* | 0.3 | 2.0 |  | 15500 | 405.28 | 196.88 | 0.485788 |
| Ethylacetate* | 0.3 | 2.5 |  | 18800 | 409.98 | 173.38 | 0.422899 |
| Ethylacetate* | 0.3 | 3.0 |  | 21200 | 415.06 | 200.52 | 0.483111 |
| Ethylacetate* | 0.3 | 3.5 |  | 27300 | 416.01 | 240.53 | 0.578183 |
| Ethylacetate* | 0.3 | 4.0 |  | 28700 | 432.68 | 198.41 | 0.458561 |
| Ethylacetate* | 0.3 | 4.5 |  | 32500 | 439.01 | 197.41 | 0.449671 |
| Ethylacetate* | 0.3 | 5.0 |  | 34300 | 446.97 | 193.73 | 0.433430 |
| Cosolvent$^a$ | 0.7 (Copolymer) | 2.0 | 5100 | 21500 | 405.44 | 234.08 | 0.577348 |
| Cosolvent$^a$ | 1.0 | 1.5 | 3310 | 72000 | 397.87 | 247.33 | 0.621635 |
| Cosolvent$^a$ | 0.5 | 2.5 | 3930 | 14400 | 413.75 | 212.25 | 0.512991 |
| Cosolvent$^a$ | 1.5 | 1.0 | 36 | 129000 | 398.57 | 245.61 | 0.616228 |
| CH$_2$Cl$_2$ | Syneleen K | 3.0 | 11400 | 128000 | 416.10 | 206.64 | 0.496611 |
| CH$_2$Cl$_2$ | Syneleen L | 1.5 | 4400 | 13000 | 401.57 | 256.41 | 0.638519 |
| Benzene | 0.2 | 3.0 | 5850 | 17300 | 413.78 | 214.06 | 0.517328 |
| Benzene | 1.0 | 1.5 | 8200 | 74000 | 399.24 | 242.22 | 0.606703 |
| Benzene | 1.4 | 1.0 | 92 | 77000 | 397.08 | 233.35 | 0.587665 |
| CH$_2$Cl$_2$ | Syneleen M | 1.0 | 22 | 84000 | 395.16 | 224.27 | 0.567542 |

*Processed polymer.
$^a$Cyclohexane/ethylacetate

| Polymerization Solvent | Phm Crosslinker | Wt. polymer/ vol H₂O process | Conc. 0.1 wt % BV mPa · S | Conc. 0.2 wt % | Conc. 0.5 wt % |
|---|---|---|---|---|---|
| Benzene | 1.4 | Control | 10 | 1,620 | 30,300 |
| Benzene* | 1.4 | 1 | 8 | 58 | 112,000 |
| Ethylacetate | 0.7 | Control | 28 | 2,940 | 37,700 |
| Ethylacetate* | 0.7 | | 30 | 11,500 | 88,000 |
| Ethylacetate | 0.3 | Control | 2,370 | 3,680 | 6,550 |
| Ethylacetate* | 0.3 | | 21,500 | 31,000 | 74,000 |
| Cosolvent[a,b] | 0.7 | Control | 3,930 | 5,350 | 8,800 |
| Cosolvent[a,b]* | 0.7 | 2 | 20,500 | 24,800 | 27,800 |
| Cosolvent[a] | 1.0 | Control | 6,050 | 21,700 | 42,500 |
| Cosolvent[a]* | 1.0 | 1.5 | 200 | 45,000 | 105,000 |
| Cosolvent[a] | 0.5 | Control | 2,120 | 3,170 | 5,050 |
| Cosolvent[a]* | 0.5 | 2.5 | 10,700 | 11,800 | 16,500 |
| Cosolvent[a] | 1.5 | Control | 145 | 5,200 | 48,000 |
| Cosolvent[a]* | 1.5 | 1 | 20 | 9,750 | >100,000 |
| CH₂Cl₂ | Synthalen K | Control | 6,600 | 29,000 | 56,000 |
| CH₂Cl₂ | Synthalen K* | 3 | 22 | 47,000 | 125,000 |
| CH₂Cl₂ | Synthalen L | Control | 2,690 | 3,540 | 6,600 |
| CH₂Cl₂ | Synthalen L* | 1.5 | 16,700 | 19,700 | 25,500 |
| CH₂Cl₂ | Synthalen M | Control | 23 | 16,500 | 40,400 |
| CH₂Cl₂ | Synthalen M* | 1 | 10 | 7,600 | 90,000 |
| Benzene | 1.0 | Control | 8,050 | 25,000 | 45,200 |
| Benzene* | 1.0 | 1.5 | 94 | 45,000 | 99,000 |

*Processed polymer
[a]Cyclohexane/ethylacetate
[b]Copolymer with sterylmethacrylate Rheological Properties of Polymers Processed in the Above Manner

| Polymerization Solvent | Crosslinker (Phm) | Wt/Vol polymer | Yield Stress Pascal | Micro- viscosity Pa · S | Thixotropic Index Pa/(s · ml) |
|---|---|---|---|---|---|
| Benzene | 1.4 | 0.5 | 57.573 | 0.69904 | 140.59 |
| Benzene* | 1.4 | 0.5 | 133.85 | 2.5796 | 533.4 |
| Ethylacetate | 0.7 | 0.5 | 41.731 | 1.4883 | 88.73 |
| Ethylacetate* | 0.7 | 0.5 | 134.21 | 5.4736 | 726.3 |
| Ethylacetate | 0.3 | 0.5 | 13.602 | 0.34546 | 1.70 |
| Ethylacetate* | 0.3 | 0.5 | 76.073 | 0.84406 | 60.93 |
| Cosolvent[a,b] | 0.7 | 0.5 | 19.286 | 0.32947 | 7.01 |
| Cosolvent[a,b]* | 0.7 | 0.5 | 63.43 | 0.68009 | 69.37 |
| Cosolvent[a] | 1.0 | 0.5 | 86.87 | 0.85499 | 33.34 |
| Cosolvent[a]* | 1.0 | 0.5 | 187.26 | 0.77346 | 42.27 |
| Cosolvent[a] | 0.5 | 0.5 | | | |
| Cosolvent[a]* | 0.5 | 0.5 | 38.709 | 0.52456 | 19.18 |
| Cosolvent[a] | 1.5 | 0.5 | 71.632 | 1.5303 | 267.23 |
| Cosolvent[a]* | 1.5 | 0.5 | 50.50 | 4.926 | 823.73 |
| CH₂Cl₂ | Synthalen K | 0.5 | 90.067 | 1.368 | 86.13 |
| CH₂Cl₂ | Synthalen K* | 0.5 | 149.67 | 5.4292 | 266.48 |
| CH₂Cl₂ | Synthalen L | 0.5 | 13.645 | 0.37322 | −3.35 |
| CH₂Cl₂ | Synthalen L* | 0.5 | 56.612 | 0.59697 | 35.48 |
| CH₂Cl₂ | Synthalen M | 0.5 | 67.134 | 1.0995 | 136.78 |
| CH₂Cl₂ | Synthalen M* | 0.5 | | | |
| Benzene | 1.0 | 0.5 | 98.682 | 0.807 | 72.15 |
| Benzene* | 1.0 | 0.5 | | | |

*Processed polymer
[a]Cyclohexane/ethylacetate
[b]Copolymer with sterylmethacrylate

Example 6

Extraction of Polymer

The crosslinked polymer is dispersed in pH 3 water. Isopropanol with NaOH is added until the solution becomes cloudy. The solids are separated from the solution by centrifugation. The solids are then dried under vacuum to remove solvent. The molecular weight of the soluble polymer is checked by GPC. After drying the solids are isolated as a white powder.

Process conditions for the above extraction method. The level of iPA remains constant as the polymer concentration increases.

| Polymerization Solvent | Cross-linker (Phm) | Wt. % | HCl BV | pH | iPa BV | IPA ml | Yield gm |
|---|---|---|---|---|---|---|---|
| Ethylacetate | 0.3 | 1 | 740 | 2.96 | 174 | 400 | 4.08 |
| Ethylacetate | 0.3 | 2 | 3090 | 2.86 | 1450 | 400 | 80.90 |
| Ethylacetate | 0.3 | 3 | 3130 | 2.80 | 3960 | 400 | 14.49 |
| Ethylacetate | 0.3 | 5 | 3200 | 2.68 | 9900 | 400 | |

Brookfield viscosity of the polymers processed in the above manner is set forth below. Note that the viscosity is modulated depending upon the polymer concentration, demonstrating control of the soluble polymer content.

| Polymerization Solvent | Cross-linker (Phm) | Wt % polymer | Conc. 0.1 wt % BV mPa · S | Conc. 0.2 wt % | Conc. 0.5 wt % |
|---|---|---|---|---|---|
| Ethylacetate | 0.3 | Control | 2,370 | 3,680 | 6,550 |
| Ethylacetate* | 0.3 | 1 | 15400 | 41800 | 62000 |
| Ethylacetate* | 0.3 | 2 | 14800 | 26900 | 47000 |
| Ethylacetate* | 0.3 | 3 | 2430 | 6000 | 16500 |

*Processed polymer

Example 7

Extraction of Polymer

Dry polymer is added to the following solution: two parts water to 1 part iPA with NaOH added to neutralize the polymer to 80%. The solids are stirred overnight. Solids are separated from the solution and dried.

Brookfield viscosity of the polymers processed in the above manner is set forth in the table below. This example demonstrates that under certain process conditions extractable residuals may be removed without removing soluble polymer or essentially changing the thickening properties of the polymer.

| Polymerization Solvent | Cross-linker (phm) | Wt/vol. Polymer | Conc. 0.1 wt % BV mPa · S | Conc. 0.2 wt % | Conc. 0.5 wt % |
|---|---|---|---|---|---|
| Ethylacetate | 0.3 | Control | 2,370 | 3,680 | 6,550 |
| Ethylacetate* | 0.3 | 5 | 3,540 | 5,200 | 8,600 |
| Ethylacetate* | 0.3 | 10 | 2,120 | 3,320 | 6,300 |

*processed polymer

Example 8

Modified hydrophilic polymers were prepared as described in Example 5 and the bioadhesive capacity of the new polymer compositions determined.

Bioadhesion Testing: Simulated Gastric Fluid (SGF) and Simulated Intestinal Fluid (SIF) were made with certified ACS grade chemicals and deionized-distilled water. Polymer (0.20g) pellets were pressed at 2 tons in a 13 mm KBr die. The pellets were affixed to the 13 mm(d)×41 mm(l) stainless steel probe using 3 M Scotch Wallsaver removable poster tape, 19 mm wide. The edges of poster tape were held tightly to the shaft of the probe with 3 M Outdoor Window Film Mounting tape, to add extra security.

All bioadhesion experiments were done at room temperature and at 1 atmosphere. A small stomach (pig) section (1½ inch×1½ inch) was soaked in SGF or SIF for 20 minutes. It was then carefully transferred to the test rig. The cell of the test rig was filled with 2.5 mL SGF or SIF at room temperature. The desired pellet was affixed to the probe and lowered into full cell, checking to be sure there were no air bubbles trapped under the pellet that would interfere with the contact area. Once clear, the test was run for six minutes at 0.5 N force. Data was graphed and analyzed using the Texture Expert software.

| Polymerization Solvent | Phm Crosslinker | Bioadhesion Capacity SGF (gs) |
|---|---|---|
| Ethylacetate | 0.3 | 507 ± 79 |
| Ethylacetate* | 0.3 | 1342 ± 69 |
| Benzene | 1.4 | 532 ± 162 |
| Benzene* | 1.4 | 1258 |
| Ethylacetate | 0.7 | 376 ± 60 |
| Ethylacetate* | 0.7 | 901 ± 124 |

*Processed polymer (outlined in Example 5).

Polymers containing other monomers of different functional groups, cross linker type and level, etc., prepared according to the process described herein will also exhibit improved bioadhesion.

Example 9

The following experimental procedure was used to determine the bioadhesive capacity of new polymer compositions.

Simulated Gastric Fluid (SGF) and Simulated intestinal Fluid (SIF) were made with Certified ACS grade chemicals and deionized-distilled water. Polymer pellets (0.2) were pressed at 2 tons in a 13 mm Kbr die. The pellets were affixed to the 13 mm (d)×41 mm (l) stainless steel probe using 3 M Scotch Wallsaver removable poster tape, 19 mm wide. The edges of the poster tape were held tightly to the shaft of the probe with 3 M Outdoor Window Film Mounting tape, to add extra security. Data was collected with the TA-X2 Texture Analyzer and analyzed with Texture Expert software.

All bioadhesion experiments were done at room temperature and at 1.0 atmosphere. A small pig stomach section ½ inch×½ inch) was soaked in SGF or SIF for 20 minutes. It was then carefully transferred to the test rig. The cell of the test rig was filled with 2.5 mL SGF or SIG at room temperature. The desired pellet was affixed to the probe and lowered into full cell, checking to be sure there were no air bubbles trapped under the pellet that would interfere with the contact area. Once clear, the test was run at 6 minutes at 0.5 N force. Data was graphed using the Texture Expert Software.

The bioadhesive data on the suffonated polymers of the present invention are shown below.

|  |  | Work of Adhesion (gs) in SGF | |
| Polymer | Composition | SGF | SIF |
| --- | --- | --- | --- |
| P-AMPS | Crosslinked homopolymer | 1445 | 442 |
| P-SEM | Crosslinked homopolymer | 570 | — |

P-AMPS: Homopolymer of AMPS (sodium salt), crosslinker (BIS) 1.5 phm
P-SEM: Homopolymer of 2-sulfoethylmethylacrylate Although the data is shown for only homopolymers, copolymers containing sulfonated and other monomers are expected to have good bioadhesive properties.

Example 10

Brookfield Viscosity measurement

A known wt. % dispersion of resin is prepared in demineralized water, using if necessary, a Lightnin mixer at 1,000 rpm with a 3 blade marine impeller. The resin can be introduced through a 20 mesh screen with stirring and the dispersion mixed for 1 hr. The dispersion is neutralized, if necessary, to pH 7.3–7.8 with NaOH, after which the mucilages were allowed to stand at room temperature for at least 30 minutes and preferably overnight. The samples were then measured for pH and Brookfield viscosity using a Brookfield RVT-DV viscometer at 20 rpm.

Example 11

Rheological measurements

A Physica Rheolab MC100 rheometer set up for torsional flow was used for the following measurements. The temperature of the measurement was 25° C. and the gap was set at 0.050 mm on a 75 mm cone with a 1° angle. A linear ramp of 0–50 sec$^{-1}$ in 300 sec was used for the forward and a linear decrease of 50-0 sec$^{-1}$ in 300 sec was used. The shear rate was controlled and the shear stress calculated from the torque. A known wt./vol. mucilage of polymer as prepared above is centrifuged to remove any bubbles. Sample mucilage is loaded on the bottom plate and excess is removed. The flow curve program is started and data collected under increasing levels of steady shear. The following information is generated with the last two properties obtained from Casson's model:

1. Viscosity is a function of shear rate $\eta(\gamma)$ $\eta = \sigma/\gamma =$ shear stress/shear rate;
2. Thixotropic index: the area between the forward ramp curve and the return ramp curve according to the following equation:

$$Y^{1/p} = a + b \cdot X^{1/p}$$

where Y is shear stress, X is shear rate, and p equals 2;
3. Yield stress $\rho$(yield value, yield point) is the Y intercept (a); and
4. Limiting viscosity at high shear rates (microviscosity, $\eta\infty$b) is the slope.

What is claimed is:

1. A crosslinked ionic polymer or salt thereof substantially free of soluble polymer and having at least one of the following features when in deionized water at a concentration of 0.5 wt %: (i) a yield stress of between about 10 and about 200 Pa, (ii) a Brookfield viscosity of between about 2,000 and about 150,000 mPa S, and (iii) a microviscosity value of between about 0.01 and about 25.0 Pa S.

2. The crosslinked ionic polymer according to claim 1 wherein the crosslinked polymer comprises at least one of a homopolymer, copolymer, terpolymer, or interpolymer hydrogel selected from the group consisting of polycarboxylic acids, polysulfonic acids, or salts thereof, and vinyl polymerizable monomers.

3. The crosslinked ionic polymer according to claim 2 wherein the polymer contains a polysulfonic acid selected from the group consisting of AMPS, sulfoethylmethacrylate (SEM), sulfopropyl methacrylate (SPM), sulfopropyl acrylate (SPA), N,N-dimethyl-N-methacryloxyethyl-N-(3-sulfopropyl)-ammonium betaine, methacrylic acid amidopropyl-dimethyl ammonium sulfobetaine, and SPI {itaconic acid-bis(1-propyl sulfonizacid-3) ester di-potassium salt}.

4. The crosslinked ionic polymer according to claim 2 wherein the polymer contains a carboxylic acid, the olefinic double bond in said carboxylic acid being in the α,β position with respect to a carboxyl group, or is part of a terminal methylene group.

5. The crosslinked ionic polymer according to claim 2 wherein the polymer contains a carboxylic acid selected from the group consisting of acrylic acids, methacrylic acids, and maleic acids.

6. The crosslinked ionic polymer according to claim 2 wherein the polymer contains at least one of a vinyl or vinylidene monomer, wherein said monomer has at least one terminal $CH_2=C$ group.

7. The crosslinked ionic polymer according to claim 6 wherein the crosslinker comprises a multifunctional vinyl or vinylidene compound, wherein said vinyl or vinylidene compound comprises between about 0.001 and about 2 mole percent of the polymer, and wherein said vinylidene monomer has at least two terminal $CH_2=C$ groups.

8. The crosslinked ionic polymer according to claim 1 wherein said polymer comprises at least one $C_1$–$C_5$ alkyl vinyl ether polymerized therein.

9. The crosslinked ionic polymer according to claim 1 wherein said polymer comprises at least one $C_2$–$C_{30}$ α-olefin polymerized therein.

10. The crosslinked ionic polymer according to claim 1 further comprising at least

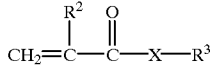

wherein $R^2$ is hydrogen, methyl or ethyl, X is O or NH, and $R^3$ is alkyl of 1 to 30 carbon atoms, and in an amount of less than 50 weight percent based upon the weight of the crosslinked ionic polymer.

11. The crosslinked ionic polymer according to claim 10 wherein $R^2$ is hydrogen or methyl and $R^3$ is an alkyl group containing 2 to 20 carbon atoms.

12. The crosslinked ionic polymer according to claim 1 wherein said crosslinker is a monomer selected from the group consisting of allyl pentaerythritol, allyl sucrose and trimethylolpropane diallylether.

13. The crosslinked ionic polymer according to claim 1 synthesized by at least one of precipitation or dispersion polymerization in an organic media.

14. The crosslinked ionic polymer according to claim 1 synthesized by reverse emulsion polymerization.

15. The crosslinked ionic polymer according to claim 1 further comprising a pharmaceutical agent.

16. A bioadhesive comprising the crosslinked ionic polymer or salt thereof according to claim 1.

17. A thickening agent comprising the crosslinked ionic polymer or salt thereof according to claim 1.

18. An emulsifying agent comprising the crosslinked ionic polymer or salt thereof according to claim 1.

19. A suspending aid comprising the crosslinked ionic polymer or salt thereof according to claim 1.

20. An excipient comprising the crosslinked ionic polymer or salt thereof according to claim 1.

21. An emulsifying stabilizing agent comprising the crosslinked ionic polymer or salt thereof according to claim 1.

22. A rheology modifying agent comprising the crosslinked ionic polymer or salt thereof according to claim 1.

23. A crosslinked ionic polymer or salt thereof having a reduced concentration of soluble polymer and further having at least one of the following features when in deionized water at a concentration of 0.5 wt %: (i) a yield stress of between about 10 and about 200 Pa, (ii) a Brookfield viscosity of between about 2,000 and about 150,000 mPa S, and (iii) a microviscosity value of between about 0.01 and about 25.0 Pa S, the polymer being produced by extracting soluble polymer from a polymer reaction product composed of a mixture of a soluble polymer fraction and a crosslinked polymer fraction to thereby produce a crosslinked polymer product with a reduced concentration of soluble polymer.

24. The polymer of claim 23, wherein the polymer is produced by extracting soluble polymer from a solid polymer reaction product to thereby produce a crosslinked polymer product having enhanced thickening properties relative to the solid polymer reaction product.

25. The polymer of claim 24, wherein the polymer is produced by contacting the solid polymer reaction product with a first extraction solvent capable of swelling the polymer reaction product followed by contacting the composition so formed with a second extraction solvent in which the polymer reaction product is only poorly soluble.

26. The polymer of claim 25, wherein the polymer is produced by dispersing the solid polymer reaction product in the first extraction solvent, neutralizing the dispersion and then contacting the dispersion with the second extraction solvent to thereby precipitate the crosslinked polymer product.

27. The polymer of claim 26, wherein the first extraction solvent is water.

28. The polymer of claim 25, wherein the first extraction solvent is acidic.

29. The polymer of claim 25, wherein the polymer reaction product is obtained by polymerization of the monomers forming the polymer reaction product in an organic solvent, and firther wherein the polymer reaction product is separated form the organic solvent before being contacted with the first extraction solvent.

30. The crosslinked ionic polymer according to claim 24 wherein the crosslinked polymer comprises at least one of a homoplymer, copolymer, terpolymer, or interpolymer hydrogel selected from the group consisting of polycarboxylic acids, polysulfonic acids, or salts thereof, and vinyl polymerizable monomers.

31. The crosslinked ionic polymer according to claim 30 wherein the polymer contains a polysulfonic acid selected from the group consisting of AMPS, sulfoethylmethacrylate (SEM), sulfopropyl methacrylate (SPM), sulfopropyl acrylate (SPA), N,N-dimethyl-N-methacryloxyethyl-N-(3-sulfopropyl)-ammonium betaine, methacrylic acid amidopropyl-dimethyl ammonium sulfobetaine, and SPI {itaconic acid-bis(1-propyl sulfonizacid-3) ester di-potassium salt}.

32. The crosslinked ionic polymer according to claim 30 wherein the polymer contains a carboxylic acid, the olefinic double bond in said carboxylic acid being in the α,β-position with respect to a carboxyl group, or is part of a terminal methylene group.

33. The crosslinked ionic polymer according to claim 30 wherein the polymer contains a carboxylic acid selected from the group consisting of acrylic acids, methacrylic acids, and maleic acids.

34. The crosslinked ionic polymer according to claim 30 wherein the polymer contains at least one of a vinyl or vinylidene monomer, wherein said monomer has at least one terminal $CH_2=C$ group.

35. The crosslinked ionic polymer according to claim 34 wherein the crosslinker comprises a multifunctional vinyl or vinylidene compound, wherein said vinyl or vinylidene compound comprises between about 0.001 and about 2 mole percent of the polymer, and wherein said vinylidene monomer has at least two terminal $CH_{22}=C$ groups.

36. The crosslinked ionic polymer according to claim 23 wherein said polymer comprises at least one $C_1$–$C_5$ alkyl vinyl ether polymerized therein.

37. The crosslinked ionic polymer according to claim 23 wherein said polymer comprises at least one $C_2$–$C_{30}$ α-olefin polymerized therein.

38. The crosslinked ionic polymer according to claim 23 fuirther comprising at least one monomer of the formula:

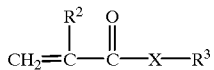

wherein $R^2$ is hydrogen, methyl or ethyl, X is O or NH, and $R^3$ is alkyl of 1 to 30 carbon atoms, and in a amount of less than 50 weight percent based upon the weight of the crosslinked ionic polymer.

39. The crosslinked ionic polymer according to claim 38 wherein $R^2$ is hydrogen or methyl and $R^3$ is an alkyl group containing 2 to 20 carbon atoms.

40. The crosslinked ionic polymer according to claim 23 wherein said crosslinker is a monomer selected from the group consisting of allyl penthaerytliritol, allyl sucrose and trimethylolpropane diallylether.

41. The crosslinked ionic polymer according to claim 23 synthesized by at least one of precipitation or dispersion polymerization in an organic media.

42. The crosslinked ionic polymer according to claim 23 synthesized by reverse emulsion polymerization.

43. The crosslinked ionic polymer according to claim 23 further comprising a pharmaceutical agent.

* * * * *